(12) United States Patent
Kucera et al.

(10) Patent No.: US 6,399,702 B1
(45) Date of Patent: Jun. 4, 2002

(54) BUTADIENE POLYMER LATEX

(75) Inventors: Helmut W. Kucera, West Springfield, PA (US); Thomas Rizzo, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/235,526

(22) Filed: Jan. 22, 1999

Related U.S. Application Data
(60) Provisional application No. 60/072,783, filed on Jan. 27, 1998.

(51) Int. Cl.[7] ............................ C08F 236/16; C08F 2/22
(52) U.S. Cl. ...................... 524/834; 524/812; 524/817; 526/201; 526/225; 526/295
(58) Field of Search ................................ 524/834, 552, 524/817; 526/201, 225

(56) References Cited

U.S. PATENT DOCUMENTS

| | | | |
|---|---|---|---|
| 2,459,739 A | 5/1949 | Montclair et al. | |
| 3,890,261 A | 6/1975 | Fitzgerald | |
| 4,054,547 A | 10/1977 | Shimizu et al. | |
| 4,400,229 A | 8/1983 | Demmer et al. | |
| 4,483,962 A * | 11/1984 | Sadoeski | 524/552 |
| 4,500,692 A | 2/1985 | Wright | |
| 4,530,987 A | 7/1985 | Lundberg et al. | |
| 4,963,613 A | 10/1990 | Toyoda et al. | |
| 4,978,409 A | 12/1990 | Fujiwara et al. | 428/378 |
| 5,051,461 A | 9/1991 | Agarwal et al. | 524/243 |
| 5,066,694 A | 11/1991 | Agarwal et al. | 524/60 |
| 5,162,156 A | 11/1992 | Troughton et al. | 428/460 |
| 5,200,455 A | 4/1993 | Warren | 524/571 |
| 5,200,459 A | 4/1993 | Weih et al. | 524/503 |
| 5,268,404 A | 12/1993 | Mowrey | 524/236 |
| 5,281,638 A | 1/1994 | Mowrey | 524/105 |
| 5,300,555 A | 4/1994 | Weih et al. | |
| 5,496,884 A | 3/1996 | Weih et al. | |

FOREIGN PATENT DOCUMENTS

| | | |
|---|---|---|
| DE | 33 21 902 A1 | 1/1984 |
| GB | 1482034 A | 8/1977 |
| GB | 2078770 B | 4/1984 |
| JP | 03 203901 | 9/1991 |
| JP | 04 198325 | 10/1992 |

* cited by examiner

*Primary Examiner*—Christopher Henderson
(74) *Attorney, Agent, or Firm*—Miles B. Dearth

(57) ABSTRACT

An aqueous composition that includes (A) a butadiene polymer latex that is prepared by an emulsion polymerization in the presence of a styrene sulfonate stabilizer and (B) a phenolic resin. A preferred aqueous butadiene polymer latex is one that is prepared by emulsion polymerization of at least 60 weight percent dichlorobutadiene monomer (based on the amount of total monomers used to form the butadiene polymer), in the presence of a styrene sulfonate stabilizer.

9 Claims, No Drawings

BUTADIENE POLYMER LATEX

This applications claims benefit of U.S. Provisional Application No. 60/072,783, filed Jan. 27, 1998.

BACKGROUND OF THE INVENTION

The present invention relates to an aqueous butadiene latex, particularly an aqueous butadiene latex that is compatible with an aqueous phenolic resin. The butadiene latex is especially useful in aqueous adhesive or primer compositions.

Various techniques are known to emulsion polymerize butadiene polymers to obtain an aqueous latex. For example, according to an English translation, DE-A-33 21 902 relates to an aqueous emulsion polymerization for making chloroprene rubber than involves polymerizing chloroprene, optionally with up to 50 weight percent of a copolymerizable monomer, in the presence of 0.5 to 5 weight percent of a rosin acid derivative and 0.1 to 10 weight percent of a polystyrene sulfonic acid derivative, based on the weight of the total monomers. Copolymers of 95 weight percent chloroprene/5 weight percent 2,3-dichlorobutadiene are exemplified. The addition of the polystyrene sulfonic acid was shown to reduce the adhesion of the chloroprene rubber to a metal mold.

U.S. Pat. No. 4,054,547 relates to a process for copolymerizing chloroprene and 0.5–10 weight percent (based on total monomers) of at least one styrene sulfonic acid or a water soluble derivative thereof in an aqueous medium to form latex particles. The addition of an ethylenically unsaturated co-monomer to the system is mentioned. 2,3-dichlorobutadiene is listed as a possible co-monomer.

U.S. Pat. No. 4,400,229 relates to an aqueous dispersion of a phenolic resole and a thermoplastic polymeric material or a rubber prepared by dissolving a solid thermoplastics material or a rubber into a liquid phenol; adding a nonionic or anionic surface active agent and/or protective colloid; adjusting the pH of the mixture to above 7; adding aqueous formaldehyde solution or a formaldehyde donor and heating the mixture to form a phenolic resole.

U.S. Pat. No. 4,500,692 relates to suspension polymerization of a vinyl aromatic monomer in the presence of an inorganic phosphate suspension system and sodium polystyrenesulfonate. The possibility of copolymerization of the vinyl aromatic monomer with a co-monomer is briefly mentioned. Butadiene is included in a list of possible co-monomers.

U.S. Pat. No. 5,051,461 relates to an emulsion of metal neutralized sulfonated copolymer of a conjugated diene and an ethoxylated alkylamine salt of styrene sulfonate, and a tackifier resin. U.S. Pat. No. 4,530,987 relates to a polymer of at least 80% by weight of a conjugated diene and a minor proportion of a metal or amine neutralized styrene sulfonate monomer.

U.S. Pat. No. 5,162,156 relates to a primer composition that includes (a) novolak phenolic resin and (b) a halogenated polyolefin. Dichlorobutadiene polymers are listed as possible halogenated polyolefins.

Commonly-assigned U.S. patent application Ser. No. 08/889,294, filed Jul. 8, 1997, relates to an aqueous adhesive composition that includes a halobutadiene homopolymer latex, an aqueous soluble or dispersible phenolic resin and a maleimide-based compound 2,3-dichloro-1,3-butadiene is the preferred halobutadiene monomer.

U.S. Pat. Nos. 5,200,459; 5,300,555; and 5,496,884 disclose emulsion polymerization of dichlorobutadiene monomers in the presence of polyvinyl alcohol and a co-solvent such as an organic alcohol or a glycol. Polyvinyl alcohol-stabilized dichlorobutadiene latex has been successfully commercialized, but it has a few drawbacks.

In particular, the use of a volatile organic co-solvent requires its removal from the emulsion latex. If not all the co-solvent is removed, the resulting latex may have an unacceptably high amount of volatile organic compounds (VOC). In addition, a high concentration of surfactants is used in the emulsion polymerization. High concentration of surfactants in adhesive compositions may cause the well-known "surfactant penalty" problem in the performance of the adhesive. The latex also suffers from compatibility problems when mixed with a water soluble phenolic resin or an aqueous dispersion or emulsion of a phenolic resin. A butadiene latex that alleviates these problems would be very desirable.

SUMMARY OF THE INVENTION

According to the present invention there is provided a stable aqueous butadiene polymer latex that utilizes a lower amount of surfactants relative to polyvinyl alcohol-stabilized butadiene latices and exhibits excellent compatibility with other aqueous components such as latices, dispersions or solutions. An important advantage of the butadiene polymer latex is its compatibility with phenolic resins. The butadiene polymer in emulsion polymerized in the presence of a styrene sulfonic acid, styrene sulfonate, poly(styrene sulfonic acid), or poly(styrene sulfonate) stabilizer to form the latex. Poly(styrene sulfonate) is the preferred stabilizer. This stabilization system is particularly effective for a butadiene polymer that is derived from at least 60 weight percent dichlorobutadiene monomer, based on the amount of total monomers used to form the butadiene polymer.

Thus, according to one embodiment there is provided an aqueous butadiene polymer latex that is prepared by emulsion polymerization of at least 60 weight percent dichlorobutadiene monomer (based on the amount of total monomers used to form the butadiene polymer), in the presence of a styrene sulfonic acid, styrene sulfonate, poly(styrene sulfonic acid), or poly(styrene sulfonate) stabilizer. According to a second embodiment there is provided an aqueous composition that includes (A) a butadiene polymer latex that is prepared by an emulsion polymerization in the presence of a styrene sulfonic acid, styrene sulfonate, poly(styrene sulfonic acid), or poly(styrene sulfonate) stabilizer and (B) a phenolic resin.

The butadiene polymer latex of the invention is particularly useful in liquid adhesives or primers, especially adhesives or primers for bonding a polymeric surface to a metallic surface.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

Certain terms used in this document are defined below.

"Butadiene polymer" means a polymer prepared from butadiene monomers alone or from a combination of butadiene monomers and other copolymerizable monomers described in more detail below. "Butadiene polymer,"

therefore, refers to butadiene homopolymer, butadiene copolymer, butadiene terpolymer, and higher polymers.

"Phenolic compound" means a compound that includes at least one hydroxy functional group attached to a carbon atom of an aromatic ring. Illustrative phenolic compounds include unsubstituted phenol per se, substituted phenols such as alkylated phenols and multi-hydroxy phenols, and hydroxy-substituted multi-ring aromatics. Illustrative alkylated phenols include methylphenol (also known as cresol), dimethylphenol (also known as xylenol), 2-ethylphenol, pentylphenol and tert-butyl phenol. "Multi-hydroxy phenolic compound" means a compound that includes more than one hydroxy group on each aromatic ring. Illustrative multi-hydroxy phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Illustrative hydroxy-substituted multi-ring aromatics include 4,4'-isopropylidenebisphenol (also known as bisphenol A), 4,4'methylidenebisphenol (also known as bisphenol F) and naphthol.

"Aldehyde compound" means a compound having the generic formula RCHO. Illustrative aldehyde compounds include formaldehyde, acetaldehyde, propionaldehyde, n-butylaldehyde, n-valeraldehyde, caproaldehyde, heptaldehyde and other straight-chain aldehydes having up to 8 carbon atoms, as well as compounds that decompose to formaldehyde such as paraformaldehyde, trioxane, furfural, hexamethylenetriamine, acetals that liberate formaldehyde on heating, and benzaldehyde.

"Phenolic resin" generally means the reaction product of a phenolic compound with an aldehyde compound.

The butadiene monomers useful for preparing the butadiene polymer latex can essentially be any monomer containing a conjugated unsaturation. Typical monomers include 2,3-dichloro-1,3-butadiene; 1,3-butadiene; 2,3-dibromo-1,3-butadiene isoprene; isoprene; 2,3-dimethylbutadiene; chloroprene; bromoprene; 2,3-dibromo-1,3-butadiene; 1,1,2-trichlorobutadiene; cyanoprene; hexachlorobutadiene; and combinations thereof. It is particularly preferred to use 2,3-dichloro-1,3-butadiene since a polymer that contains as its major portion 2,3-dichloro-1,3-butadiene monomer units has been found to be particularly useful in adhesive applications due to the excellent bonding ability and barrier properties of the 2,3-dichloro-1,3-butadiene-based polymers. As described above, an especially preferred embodiment of the present invention is one wherein the butadiene polymer includes at least 60 weight percent, preferably at least 70 weight percent, 2,3-dichloro-1,3-butadiene monomer units.

The butadiene monomer can be copolymerized with other monomers. Such copolymerizable monomers include α-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; α-bromovinylketone; vinylidene chloride; vinyl toluenes; vinylnaphthalenes; vinyl ethers, esters and ketones such as methyl vinyl ether, vinyl acetate and methyl vinyl ketone; esters amides, and nitriles of acrylic and methacrylic acids such as ethyl acrylate, methyl methacrylate, glycidyl acrylate, methacrylamide and acrylnitrile; and combinations of such monomers.

The copolymerizable monomers, if utilized, are preferably α-haloacrylonitrile and/or α,β-unsaturated carboxylic acids. The copolymerizable monomers may be utilized in an amount of 0.1 to 30 weight percent, based on the weight of the total monomers utilized to form the butadiene polymer.

The butadiene polymer latex can be made by known emulsion polymerization techniques that involve polymerizing the butadiene monomer (and copolymerizable monomer, if present) in the presence of water and the styrene sulfonic acid, styrene sulfonate, poly(styrene sulfonic acid), or poly(styrene sulfonate) stabilizer. A useful polystyrene sulfonic acid is commercially available from Monomer-Polymer and Dajac Laboratories, Inc. The sulfonates can be salts of any cationic groups such as sodium, potassium or quaternary ammonium. Sodium styrene sulfonate is a preferred styrene sulfonate compound. Poly(styrene sulfonate) polymers include poly(styrene sulfonate) homopolymer and poly(styrene sulfonate) copolymers such as those with maleic anhydride. Sodium salts of poly(styrene sulfonate) are particularly preferred and are commercially available from National Starch under the trade designation VERSA TL. The poly(styrene sulfonate) can have a weight average molecular weight from $5 \times 10^4$ to $1.5 \times 10^6$, with $1.5 \times 10^5$ to $2.5 \times 10^5$ being preferred. In the case of a poly(styrene sulfonate) or poly(styrene sulfonic acid) it is important to recognize that the emulsion polymerization takes place in the presence of the pre-formed polymer. In other words, the butadiene monomer is contacted with the pre-formed poly(styrene sulfonate) or poly(styrene sulfonic acid). The stabilizer preferably is present in an amount of 0.1 to 10 parts, preferably 1 to 5 parts, per 100 parts by weight of total monomers utilized to form the butadiene polymer.

In carrying out the emulsion polymerization to produce the latex other optional ingredients may be employed during the polymerization process. For example, conventional anionic and/or nonionic surfactants may be utilized in order to aid in the formation of the latex. Typical anionic surfactants include carboxylates such as fatty acid soaps from lauric, stearic, and oleic acid; acyl derivatives of sarcosine such as methyl glycine; sulfates such as sodium lauryl sulfate; sulfated natural oils and esters such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphates esters such as short chain fatty alcohol partial esters of complex phosphates; and orthophosphate esters of polyethoxylated fatty alcohols. Typical nonionic surfactants include ethoxylated (ethylene oxide) derivatives such as ethoxylated alkyl aryl derivatives; mono- and polyhydric alcohols; ethylene oxide/propylene oxide block copolymers; esters such as glyceryl monostearate; products of the dehydration of sorbitol such as sorbitan monostearate and polyethylene oxide sorbitan monolaurate; amines; lauric acid; and isopropenyl halide. A conventional surfactant, if utilizes, is employed in an amount of 0.01 to 5 parts, preferably 0.1 to 2 parts, per 100 parts by weight of total monomers utilized to form the butadiene polymer.

In the case of dichlorobutadiene homopolymers, anionic surfactants are particularly useful. Such anionic surfactants include alkyl sulfonates and alkyl aryl sulfonates (commercially available from Stepan under the trade designation POLYSTEP) and sulfonic acids or salts of alkylated diphenyl oxide (for example, didodecyl diphenyleneoxide disulfonate or dihexyl diphenyloxide disulfonate commercially available from Dow Chemical Co. under the trade designation DOWFAX).

Chain transfer agents may also be employed during emulsion polymerization in order to control the molecular weight of the butadiene polymer and to modify the physical properties of the resultant polymer as is known in the art. Any of the conventional organic sulfur-containing chain transfer agents may be utilized such as alkyl mercaptans and dialkyl xanthogen disulfides.

The formation of the latex is carried out by emulsion polymerizing the appropriate monomers in the presence of the styrene sulfonate stabilizer and the optional ingredients. Specifically, an aqueous emulsification mixture of water and the styrene sulfonate is formed to which is added the appropriate monomers. The emulsification mixture preferably contains 40 to 80, more preferably 50 to 70, weight percent water.

The emulsion polymerization is typically triggered by a free radical initiator. Illustrative free radical initiators include conventional redox systems, peroxide systems, azo derivatives and hydroperoxide systems. The use of a redox system is preferred and examples of such systems include ammonium persulfate/sodium metabisulfite, ferric sulfate/ascorbic acid/hydroperoxide and tributylborane/hydroperoxide, with ammonium persulfate/sodium metabisulfite being most preferred.

The emulsion polymerization is typically carried out at a temperature of 10°–90° C., preferably 40°–60° C. Monomer conversion usually ranges from 70–100, preferably 80–100, percent. The latices preferably have a solids content of 10 to 70, more preferably 30 to 60, percent; a viscosity between 50 and 10,000 centipoise at 25° C.; and a particle size between 60 and 300 nanometers.

The latices of the present invention exhibit both superior mechanical stability and electrolytic stability. Mechanical stability means that the latex does not irreversibly phase disperse or irreversibly form a precipitate or coagulant over an extended period of time. It is expected that latices according to the invention should remain mechanically stable (in other words, have a shelf life) for at least 12 months. Electrolytic stability means that the latices are very resistant to changes in ionic strength. This characteristic is important when the latices are formulated with other ionic components, particularly salts, to create a multi-component composition such as an adhesive.

As described above, one embodiment of the present invention is a composition that includes the styrene sulfonate-stabilized butadiene latex and a phenolic resin and is especially useful to bond elastomeric surfaces to metallic surfaces. The phenolic resin can be any waterborne-type that is compatible with the styrene sulfonate-stabilized butadiene latex. Illustrative phenolic resins include water soluble phenolic resins and an aqueous phenolic resin dispersions. Phenolic resins are well-known materials and can be a novolak, a resole or a mixture thereof.

The phenolic resole is an aqueous dispersible or soluble heat-reactive condensation product of an aldehyde compound with a phenolic compound. The resoles are well-known and are typically prepared by reacting a phenolic compound with an excess of an aldehyde compound in the presence of a base catalyst. Illustrative waterborne phenolics include polyvinyl alcohol-stabilized aqueous resole dispersions; an aqueous dispersion of a heat-reactive hydrophilic phenolic resin, a hydrophobic etherified bisphenol-A resin and a protective colloid as described in U.S. Pat. No. 5,548,015 (incorporated herein by reference); water-soluble sulfonated phenolic resin; aqueous novolak resins as described in U.S. Pat. No. 4,167,500 (incorporated herein by reference); aqueous solutions of lower condensate of phenolic resin; aqueous solutions of phenolic resins containing concentrated caustic acid; aqueous emulsions of phenolic resins that include polyacrylamide as described in U.S. Pat. No. 4,131,582 (incorporated herein by reference); and aqueous novolak dispersions as described in U.S. Pat. No. 4,788,236 (incorporated herein by reference).

One desirable phenolic resole is a polyvinyl alcohol-stabilized aqueous dispersion of a resole. This dispersion can be prepared by a process that includes mixing the preformed, solid, substantially water-insoluble, phenolic resole resin; water; an organic coupling solvent; and polyvinyl alcohol, at a temperature and for a period of time sufficient to form a dispersion of the phenolic resole resin in water. Such polyvinyl alcohol-stabilized aqueous resole dispersions are described in more detail in U.S. Pat. No. 4,124,554, incorporated herein by reference, and are available commercially from Georgia Pacific Corporation under the tradename UCAR® BKUA-2370 and UCAR® BKUA-2392. According to U.S. Pat. No. 4,124,554, the water-insoluble resole is produced by reacting formaldehyde with bisphenol-A in a mole ratio of 2 to 3.75 moles of formaldehyde per mole of bisphenol-A in the presence of a catalytic amount of an alkali metal or barium oxide or hydroxide condensation catalyst wherein the reaction is carried out at elevated temperatures. The condensation product is then neutralized to a pH of 3 to 8. Alcohols, glycol ethers, ethers, esters and ketones are the most useful coupling solvents. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like. The polyvinyl alcohol is typically prepared by hydrolysis of polyvinyl acetate. The most useful polyvinyl alcohol polymers are hydrolyzed to an extent of 85 to 91 percent and have molecular weights such that a 4 percent solids solution of the polyvinyl alcohol in water has a viscosity of 4 to 25 centipoises at 25° C.

The amount of the phenolic resin can range broadly depending upon the particular use of the composition. In general, the phenolic resin can be present in an amount of 5 to 90, preferably 50 to 75, weight percent, based on the total amount of butadiene latex and phenolic resin.

When utilizing the butadiene polymer latices of the present to bond a polymeric surface to a metallic surface, it may be desirable to use other adhesion promoting additives. One such additive is an aromatic nitroso compound. The aromatic nitroso compound can be any aromatic hydrocarbon, such as benzenes, naphthalenes, anthracenes, biphenyls, and the like, containing at least two nitroso groups attached directly to non-adjacent ring carbon atoms. Such aromatic nitroso compounds are described, for example, in U.S. Pat. No. 3,258,388; U.S. Pat. No. 4,119,587 and U.S. Pat. No. 5,496,884.

More particularly, such nitroso compounds are described as aromatic compounds having from 1 to 3 aromatic nuclei, including fused aromatic nuclei, having from 2 to 6 groups attached directly to non-adjacent nuclear carbon atoms. The preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen and similar groups. Thus, where reference is made herein to "aromatic nitroso compound" it will be understood to include both substituted and unsubstituted nitroso compounds.

Particularly preferred nitroso compounds are characterized by the formula:

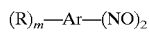

wherein Ar is selected from the group consisting of phenylene and naphthalene; R is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and m is 0, 1, 2, 3, or 4, and preferably is 0.

Exemplary suitable aromatic nitroso compounds include m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred are m-dinitrosobenzene and p-dinitrosobenzene.

The aromatic nitroso compound precursor may be essentially any compound that is capable of being converted, typically by oxidation, to a nitroso compound at elevated temperatures, typically from about 140–200° C. The most common aromatic nitroso compound precursors are derivatives of quinone compounds. Examples of such quinone compound derivatives include quinone dioxime, dibenzoquinone dioxime, 1,2,4,5-tetrachlorobenzoquinone, 2-methyl-1,4-benzoquinone dioxime, 1,4-naphthoquinone dioxime, 1,2-naphthoquinone dioxime and 2,6-naphthoquinone dioxime.

The aqueous adhesive compositions can also optionally include other well known additives such as a metal oxide (for example, zinc oxide, lead oxide and zirconium oxide), lead-containing compounds (for example, polybasic lead salts of phosphorous acid and saturated and unsaturated organic dicarboxylic acids and anhydrides), plasticizers, fillers, pigments, surfactants, dispersing agents, wetting agents, reinforcing agents and the like, in amounts employed by those skilled in the adhesive arts. Examples of optional ingredients include carbon black, silica such as fumed silica, sodium aluminosilicate and titanium dioxide.

Water, preferably deionized water, is utilized in combination with the butadiene latex and the phenolic resin and any optional components of the invention in order to provide an adhesive or primer composition having any desired final solids content.

The adhesive or primer compositions may be prepared by any method known in the art, but are preferably prepared by combining and milling or shaking the ingredients and water in a ball-mill, sand-mill, ceramic bead-mill, steel bead-mill, high speed media-mill or the like. The butadiene polymer typically is formulated into the composition in the latex form and the phenolic resin is formulated into the composition in the dispersion form. The other components may be formulated into the composition in any convenient form such as a dispersion, solution, solid, etc.

The adhesive or primer composition may be applied to a surface or substrate for bonding by spraying, dipping, brushing, wiping, roll-coating (including reverse roll-coating) or the like, after which the adhesive composition is permitted to dry. The composition typically is applied in an amount sufficient to form a dry film.

The adhesive or primer composition can be used to bond any types of substrates or surfaces together, but it is particularly useful to bond a metal substrate or surface to a polymeric material substrate or surface. The polymeric material can be any elastomeric material selected from any of the natural rubbers and olefinic synthetic rubbers including polychloroprene, polybutadiene, neoprene, styrene-butadiene copolymer rubber, arcylonitrile-butadiene copolymer rubber, ethylene-propylene copolymer rubber (EPM), ethylene-propylene-diene terpolymer rubber (EPDM), butyl rubber, brominated butyl rubber, alkylated chlorosulfonated polyethylene and the like. The material may also be a thermoplastic elastomer such as those sold under the tradenames SANTOPRENE and ALCRYN by Monsanto and DuPont, respectively. The metal substrate may be selected from any of the common structural metals such as iron, steel (including stainless steel and electrogalvanized steel), lead, aluminum, copper, brass, bronze, MONEL metal alloy, nickel, zinc and the like. Prior to bonding, the metal surface is typically cleaned according to one or more methods known in the art such as degreasing, grit-blasting and zinc-phosphatizing.

The adhesive or primer composition usually is applied to the metal and/or polymeric surface and the substrate surfaces are then brought together under heat and pressure to complete the bonding procedure. The exact conditions selected will depend upon the particular polymer being bonded and whether or not it is cured. In some cases, it may be desirable to preheat the metal surface prior to application of the adhesive composition to assist in drying of the adhesive composition. The coated surface of the metal and the polymeric substrate are typically brought together under a pressure of from 20 to 175 MPa, preferably from 20 to 50 MPa. If the polymer is uncured, the resulting polymer-metal assembly is simultaneously heated to a temperature of from 140° C. to 200° C., preferably from 150° C. to 170° C. The assembly should remain under the applied pressure and temperature for a period of 3 minutes to 60 minutes, depending on the cure rate and thickness of the polymeric substrate. If the polymer is already cured, the bonding temperature may range from 90° C. to above 180° C. for 15 to 120 minutes.

The bonding process may be carried out by applying the polymeric substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

The invention will be described in more detail by way of the following non-limiting examples.

Mechanical stability of the exemplified latices was measured by filtering a 50.0 g latex sample through a sieve (325 mesh) into a tared 125-mL Erlenmeyer flask. The filtrate weight was recorded as the "Start Weight." The filtrate was transferred into a Waring Blender cup and the blender was run at high speed for 60 seconds. The contents of the blender cup was filtered through a sieve (325 mesh) into another tared 125-mL Erlenmeyer flask. The filtrate weight was recorded as the "Final Weight." The mechanical stability was calculated as: Mechanical stability (%)=(Final Weight (g)×100)/(Start weight (g)).

Electrolytic stability of the exemplified latices was measured by preparing calcium chloride (0.025M) solution as a titrant. A latex sample of 5.00 g was weighed into a 50-mL Erlenmeyer flask and diluted with 5.00 mL in water. A magnetic stir bar was added to the flask. The sample was dropwise titrated with the calcium chloride solution until the sample coagulated. The amount in mmoles of calcium chloride required was calculated as: Electrolytic stability (mmoles of $CaCl_2$)=(Volume titrant (mL))×Concentration titrant (M)). The titration was usually done three times and the average result was reported. Samples that require greater than 25 mL of titrant were considered totally stable and reported as >1.25 mmoles of $CaCl_2$.

EXAMPLE 1

A reactor was equipped with a mechanical stirrer, a thermocouple, a nitrogen inlet, a monomer inlet tube and a condenser. The reactor was charged with 0.220 g (0.10 pphm) of DOWFAX 2A1, 13.42 g (4.00 pphm) of poly (styrene sulfonate) (VERSA TL-130), 0.2002 g of sodium acetate and 135.66 g of water. The reaction interior was heated to 45° C. and held at this temperature for the rest of the procedure. 5.01 g of dichlorobutadiene monomer was charged to the reactor and the temperature was allowed to stabilize. An initiator solution of 0.1007 g (0.100 pphm) of sodium persulfate dissolved in 5.05 g water was charged to the reactor and the monomer feed was started, which consisted of 95.03 g of dichlorobutadiene. The feed lasted approximately 3 hours and the heating continued after the feed for 1 hour. The resulting product was a latex having a solids content of 39.21%, mechanical stability of 90.24% and electrolytic stability of >1.25 mmoles of $CaCl_2$.

EXAMPLE 2

The procedure of Example 1 was repeated except that VERSA TL-4 was substituted for VERSA TL-130 and there was no DOWFAX 2A1. The resulting product was a latex having a solids content of 35.3%, a mechanical stability of 91.7% and an electrolytic stability of 0.504.

EXAMPLE 3

The procedure of Example 1 was repeated except that VERSA TL-501 was substituted for VERSA TL-130 and there was no DOWFAX 2A1. The resulting product was a latex having a solids content of 35.3%, a mechanical stability of 78.1% and an electrolytic stability of >1.25.

EXAMPLE 4

A reactor was equipped with a mechanical stirrer, a thermocouple, a nitrogen inlet, a monomer pump feed tube, an initiator pump feed tube and a condenser. The reactor was charged with 26.67 g of poly(styrene sulfonate) (VERSA TL-130), 3.556 g of DOWFAX 2A1 and 491.27 g of water. Two drops of a ferric chloride solution and 0.08 g of 2-ethylhexyl thioglycolate then were added to the reactor. The reaction interior was heated to 45° C. and held at this temperature for the rest of the procedure. 14.0 g of dichlorobutadiene monomer was charged to the reactor and the temperature was allowed to stabilize. 0.878 g of sodium meta-bisulfite dissolved in 10.0 g of water and 10.0 g of 0.958 g of ammonium persulfate dissolved in 50.0 g of water was charged in the reactor and both the monomer and the initiator pump feeds were started. The monomer feed was 386.0 g of dichlorobutadiene and the interior feed was the remaining 40.0 g of the ammonium persulfate solution. The feed lasted 135 minutes and the heating continued after the feed for 30 minutes. The resulting product was a white latex having a percent solids of 34.5%.

EXAMPLE 5

The procedure of Example 1 was repeated except that POLYSTEP A18 was substituted for DOWFAX 2A1. The resulting product was a white latex having a percent solids of 40.3% and a mechanical stability of 84.6%.

EXAMPLE 6

The procedure of Example 1 was repeated except that POLYSTEP A4 was substituted for DOWFAX 2A1. The resulting product was a white latex having a percent solids of 38.4% and a mechanical stability of 92.6%.

What is claimed is:

1. An aqueous butadiene polymer latex prepared by emulsion polymerization of a monomer mixture comprising at least 60 weight percent, 2,3-dichloro-1,3-butadiene and from 0.1 to 30 wt. % of α-haloacrylonitrile in the presence of a stabilizer selected from styrene sulfonic acid, styrene sulfonate, poly(styrene) sulfonic acid or poly(styrene sulfonate) and an other anionic surfactant, wherein the weight percent is based on the weight of total monomers used to prepare the butadiene polymer.

2. A latex according to claim 1 wherein the stabilizer comprises poly(styrene sulfonate).

3. A latex according to claim 1 wherein the monomer mixture further comprises a copolymerizable monomer selected from α,β-unsaturated carboxylic acid, alkyl-2-haloacrylate, α-bromovinylketone, vinylidene chloride, vinyl toluene vinyl naphthalene, vinyl ether, vinyl ester, vinyl ketone, ester amide, and nitrile of (meth)acrylic acid.

4. A latex according to claim 1 further comprising effecting the emulsion polymerization in the presence of an anionic surfactant.

5. A method for making an aqueous butadiene polymer latex comprising emulsion polymerization of a monomer mixture comprising at least 60 weight percent 2,3-dichloro-1,3-butadiene and from 0.1 to 30 wt. % of α-haloacrylonitrile in the presence of a stabilizer selected from styrene sulfonic acid, styrene sulfonate, poly(styrene) sulfonic acid or poly(styrene sulfonate) and an other anionic surfactant, wherein the weight percent is based on the weight of total monomers used to prepare the butadiene latex.

6. A method according to claim 5 wherein the stabilizer comprises poly(styrene sulfonate).

7. A method according to claim 5 wherein the monomer mixture further comprises a copolymerizable monomer selected from α,β-unsaturated carboxylic acid, alkyl-2-haloacrylate, α-bromovinylketone, vinylidene chloride, vinyl toluene, vinyl naphthalene, vinyl ether, vinyl ester, vinyl ketone, ester amide, and nitrile of (meth)acrylic acid.

8. A method according to claim 5 wherein the anionic surfactant is selected from an alkyl sulfonate or alkyl aryl sulfonate.

9. A method according to claim 8 wherein the anionic surfactant comprises a sulfonic acid or salt of an alkylated diphenyl oxide.

* * * * *